R. G. MARCY.
PUMP-VALVE.

No. 173,980. Patented Feb. 22, 1876.

WITNESSES
Henry N. Miller
C. L. Evert.

INVENTOR
Rufus G. Marcy
By Alexander Mason
Attorneys

UNITED STATES PATENT OFFICE.

RUFUS G. MARCY, OF FORT WAYNE, INDIANA.

IMPROVEMENT IN PUMP-VALVES.

Specification forming part of Letters Patent No. 173,980, dated February 22, 1876; application filed January 22, 1876.

*To all whom it may concern:*

Be it known that I, R. G. MARCY, of Fort Wayne, in the county of Allen and in the State of Indiana, have invented certain new and useful Improvements in Pump-Valves; and do hereby declare that the following is a full, clear, and exact description thereof, reference being had to the accompanying drawings, and to the letters of reference marked thereon, making a part of this specification.

The nature of my invention consists in the construction and arrangement of a valve for well-pumps, as will be hereinafter more fully set forth.

In order to enable others skilled in the art to which my invention appertains to make and use the same, I will now proceed to describe its construction and operation, referring to the annexed drawing, in which—

Figure 1:
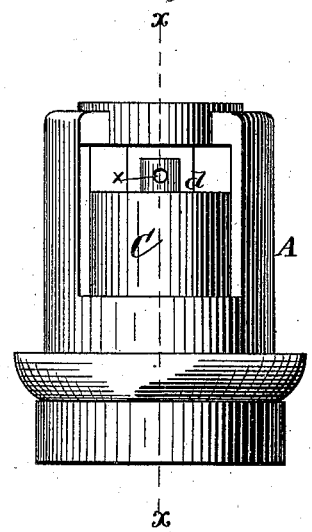
Figure 2:
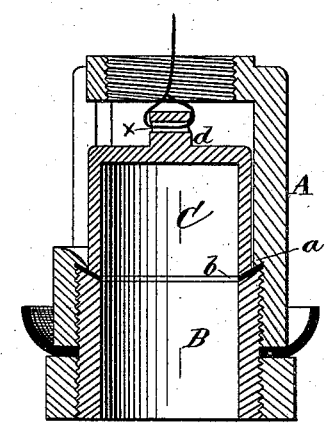

Figure 1 is a side view of my valve. Fig. 2 is a vertical section of the same.

A represents the cage, with three perpendicular columns which hold the valve in its proper place. B is a ring, which screws into the lower end of the cage A, and having its upper end either square or beveled, as may be desired. On the upper or faced end of the ring B is placed a gasket, b, of rubber or other suitable elastic material, which is secured in place by screwing the ring up against the circumferential shoulder a on the interior of the cage, and said gasket thus forms a cheap and perfect elastic valve-seat.

The cage of the bottom valve in the well-pump has a right-hand female screw at one end, and a left-hand one at the other end; and the tops of both cages are constructed alike in both valves, so that, after the upper valve is removed, the sucker-rod that handles said upper valve can easily be screwed into the lower valve, and when screwed up tight therein the valve will give loose at the bottom and turn out of its fastening, so as to be taken up; and it may be lowered to place again in the same way.

The cup or valve proper C is cast in the form of an inverted cup, and has a lug, d, on top, through which is a hole, x, so that by fastening a wire or strong line therein, the cup may be raised and allow the sand to pass down, which would otherwise bind it solid.

The rubber or elastic valve-seat forms a tight and perfect water-joint, even when sand is running in a new well.

Having thus fully described my invention, what I claim as new, and desire to secure by Letters Patent, is—

The combination of the valve C, the rubber or elastic gasket b, the ring B, and cage A, with its interior circumferential shoulder a, all constructed substantially as and for the purposes herein set forth.

In testimony that I claim the foregoing I have hereunto set my hand this 31st day of December, 1875.

RUFUS G. MARCY.

Witnesses:
MILTON S. PHILLEY,
DAVID T. VINE.